United States Patent
Finnell et al.

(10) Patent No.: US 10,465,823 B2
(45) Date of Patent: Nov. 5, 2019

(54) CONDUIT IDENTIFICATION TAGS

(71) Applicant: Indiana University Research and Technology Corporation, Indianapolis, IN (US)

(72) Inventors: John Finnell, Zionsville, IN (US); Jeff Quinn, Carmel, IN (US); Brad Wheeler, Greenwood, IN (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 113 days.

(21) Appl. No.: 15/519,154

(22) PCT Filed: Oct. 21, 2015

(86) PCT No.: PCT/US2015/056565
§ 371 (c)(1),
(2) Date: Apr. 13, 2017

(87) PCT Pub. No.: WO2016/064951
PCT Pub. Date: Apr. 28, 2016

(65) Prior Publication Data
US 2017/0227147 A1    Aug. 10, 2017

Related U.S. Application Data

(60) Provisional application No. 62/066,438, filed on Oct. 21, 2014.

(51) Int. Cl.
*F16L 55/00* (2006.01)
*F16L 11/12* (2006.01)
*B65C 3/02* (2006.01)

(52) U.S. Cl.
CPC .............. *F16L 11/124* (2013.01); *B65C 3/02* (2013.01)

(58) Field of Classification Search
CPC ....... F16L 11/124; F16L 2201/60; B65C 3/02; H02G 2200/20
(Continued)

(56) References Cited

U.S. PATENT DOCUMENTS 4,234,090 A * 11/1980 Barbieri .................... G09F 3/06
                                                       206/459.5
4,300,284 A * 11/1981 Reeder ................ B29C 61/0608
                                                        174/112

(Continued)

FOREIGN PATENT DOCUMENTS

WO    WO98/19288 A2    5/1998
WO    WO 2013/138649 A1    9/2013

OTHER PUBLICATIONS

International Preliminary Report on Patentability issued by The International Bureau of WIPO, dated Apr. 25, 2017, for International Application No. PCT/US2015/056565; 11 pages.

(Continued)

*Primary Examiner* — James F Hook
(74) *Attorney, Agent, or Firm* — Faegre Baker Daniels LLP

(57) ABSTRACT

An identifier for a conduit includes a first tag having a body with a first aperture formed therein for receiving the conduit and a first identifying feature, and a second tag having a body with a second aperture formed therein for receiving the conduit and a second identifying feature that matches the first identifying feature. The first tag is attached to the conduit adjacent one end, the second tag is attached to the conduit adjacent another end, and the ends are identified as ends of the same conduit by the matching first and second identifying features.

22 Claims, 2 Drawing Sheets

(58) Field of Classification Search
USPC .......... 138/104, 109; 174/112; 40/316, 667, 40/666
See application file for complete search history.

(56) References Cited

U.S. PATENT DOCUMENTS

| | | | |
|---|---|---|---|
| 4,378,648 A * | 4/1983 | Loof ................... | H01B 7/368 |
| | | | 40/316 |
| 4,539,767 A | 9/1985 | Jaffe | |
| 5,974,708 A * | 11/1999 | Webb ................... | A61M 5/14 |
| | | | 40/316 |
| 9,228,680 B2 * | 1/2016 | Campbell ............... | F16L 3/223 |
| 2005/0204594 A1 | 9/2005 | Savagian et al. | |
| 2007/0088286 A1 * | 4/2007 | Brier .................. | A61M 5/1408 |
| | | | 604/189 |
| 2009/0139743 A1 | 6/2009 | Smith | |
| 2009/0277055 A1 * | 11/2009 | Madrigal ............. | G09F 3/0295 |
| | | | 40/316 |
| 2010/0101821 A1 | 4/2010 | Agan et al. | |
| 2011/0220386 A1 * | 9/2011 | Temblador ............ | G06Q 50/04 |
| | | | 174/102 C |
| 2012/0260543 A1 | 10/2012 | Dunn et al. | |

OTHER PUBLICATIONS

International Search Report and Written Opinion issued by the ISA/US, Commission for Patents, dated Dec. 29, 2015, for International Application No. PCT/US2015/056565; 12 pages.

* cited by examiner

CONDUIT IDENTIFICATION TAGS

RELATED APPLICATIONS

This application is a National Stage Application under 35 U.S.C. § 371 of PCT Application No. PCT/US2015/056565, filed on Oct. 21, 2015, which claims priority to U.S. provisional application Ser. No. 62/066,438, filed on Oct. 21, 2014, the entire disclosures of which are hereby expressly incorporated herein by reference.

FIELD

The present disclosure relates generally to identification tags for conduits, and more particularly, to pairs of matching tags configured for attachment to ends of conduits.

BACKGROUND

Conduits of a variety of types are used in delivering electrical signals, electrical power, or a substance over a distance. Often, numerous conduits are used in close proximity to one another to deliver a plurality of signals, power, or substances between locations. Identifying the function of the plurality of conduits can be difficult, particularly when the conduits become entangled or obscured from view for a portion of the distance over which they extend.

In particular, conduits used in a healthcare setting, such as medical tubing for intravenous ("IV") delivery of substances and electrical leads, may be difficult to identify and distinguish from one another. A patient undergoing treatment in a healthcare setting, such as an emergency room, ambulance, critical care unit, nursing home, or outpatient clinic, may be connected to numerous electrical leads and medical tubing for collecting vital information and delivering essential nutrition and therapies.

Healthcare professionals regularly monitor patients' vital signs, as well nutrition and therapy levels delivered through IV tubing. In addition, healthcare professionals must regularly check and replace IV connections at various connection sites to change or replenish the nutrition and therapies being provided to the patient. Connections at the IV site on the patient may be changed at least every 72 hours to reduce the risk of infection.

These tasks can be challenging given the plurality of leads, tubing, and devices that can be associated with a patient and that can become entangled with one another. Healthcare professionals typically identify the function of each conduit by tracking the conduit from its source, through a tangle of conduits, to the point of connection to the patient to ensure that the correct nutrition or therapy is applied. The time required for tracking the path of a conduit can be significant, and, in rare instances, may lead to errors in configuring the conduits. Consequently, the many electrical leads, tubes, and medical devices in proximity to the patient present challenges for patient care.

In other environments, identification of electrical cables is the challenge. Many cables extend over a substantial distance and are often routed within walls of a structure or underground between the source and destination locations. As such, at least a portion of the cables are not visible. Once the cables are placed in the walls and covered, identifying the cables at different locations may require specialized electrical equipment that can detect a signal at each location of the cable. In other environments, such as in a home office or home theater, a user may have a substantial number of cables located within a small area. The cables can become entangled, and substantial effort can be required to identify the cables at each end.

To address these issues, some users apply pieces of tape with handwritten identifiers to the conduits. However, the adhesive on the tape can degrade over time and the tape can fall off the conduits, or the handwritten identifiers may become illegible. In addition, tapes and adhesives can leave sticky residues causing cables or tubing to become even more entangled. A more reliable approach for identifying conduits is therefore desirable.

SUMMARY

According to one embodiment of the disclosure, an identifier for a conduit is provided comprising a first tag having a body with a first aperture formed therein for receiving the conduit and a first identifying feature, and a second tag having a body with a second aperture formed therein for receiving the conduit and a second identifying feature that matches the first identifying feature. The first tag is attached to the conduit adjacent one end, the second tag is attached to the conduit adjacent another end, and the ends are identified as ends of the same conduit by the matching first and second identifying features. In one aspect of this embodiment, the first identifying feature has a first shape and the second identifying feature has a second shape that is the same as the first shape but larger than the first shape. In a variant of this aspect, the first shape is formed by a cut-out portion of the first tag body and the second shape is formed by cut-out portion of the second tag body. In another variant, the first shape is formed by one of an indented portion and a raised portion of the first tag body and the second shape is formed by one of an indented portion and a raised portion of the second tag body.

In still another variant, the first tag includes an identifying pattern on the first tag body and the second tag includes an identifying pattern on the second tag body that matches the identifying pattern of the first tag. In a variant of this variant, the first tag includes a color on the first tag body and the second tag includes a color on the second tag body that matches the color of the first tag. In another aspect of this embodiment, the identifier further comprises a connecting element, the first tag being coupled to the connecting element by a frangible connection and the second tag being coupled to the connecting element by a frangible connection. In a variant of this aspect, the first tag is coupled to the connecting element at a location opposite from a location wherein the second tag is coupled to the connecting element. In another variant, the first tag is smaller than the second tag. In one aspect of this embodiment, the first tag body includes a gap formed along an edge of the body and a restriction extending from the first aperture so that the body is connected to the conduit by passing the conduit through the gap, past the restriction and into the first aperture. In another aspect, the second tag body includes a gap formed along an edge of the body and a restriction extending from the second aperture so that the body is connected to the conduit by passing the conduit through the gap, past the restriction and into second aperture.

In another embodiment of the present disclosure, a set of identifiers for a plurality of conduits is provided comprising a connecting element, and a plurality of pairs of tags coupled to the connecting element, each pair of tags including a first tag having a body with a first aperture formed therein for receiving a conduit and a first identifying feature, and a second tag having a body with a second aperture formed therein for receiving the conduit and a second identifying feature that matches the first identifying feature. The first tag of each pair is attached to the conduit adjacent one end, the second tag is attached to the conduit adjacent another end, and the ends are identified as ends of the same conduit by the matching first and second identifying features. In one aspect of this embodiment, each pair of tags is coupled to the connecting element by a frangible connection. In another aspect, one tag of each pair of tags is coupled to another tag of the pair of tags by a frangible connection. In yet another aspect, the first aperture and the second aperture include a diameter that corresponds to a diameter of the conduit and wherein the first tag attaches to the conduit by way of the first aperture and the second tag attaches to the conduit by way of the second aperture.

In yet another aspect, the first identifying feature has a first shape and the second identifying feature has a second shape that is the same as the first shape but larger than the first shape. In a variant of this aspect, the first shape is formed by a cut-out portion of the first tag body and the second shape is formed by cut-out portion of the second tag body. In another variant of this aspect, the first shape is formed by one of an indented portion and a raised portion of the first tag body and the second shape is formed by one of an indented portion and a raised portion of the second tag body. In yet another variant of this aspect, the first tag includes an identifying pattern on the first tag body and the second tag includes an identifying pattern on the second tag body that matches the identifying pattern of the first tag. In yet another aspect of this embodiment, the first tag body includes a gap formed along an edge of the body and a restriction extending from the first aperture so that the body is connected to the conduit by passing the conduit through the gap, past the restriction and into the first aperture. In yet another aspect of this embodiment, the second tag body includes a gap formed along an edge of the body and a restriction extending from the second aperture so that the body is connected to the conduit by passing the conduit through the gap, past the restriction and into second aperture.

In still another embodiment, a method of identifying a conduit is provided comprising separating a pair of tags from one another by breaking at least one frangible connection between the tags, attaching a first tag from the pair of tags to the conduit by positioning the conduit in an aperture formed in the first tag, positioning the first tag adjacent a first end of the conduit, attaching a second tag from the pair of tags to the conduit by positioning the conduit in an aperture formed in the second tag, positioning the second tag adjacent a second end of the conduit, and identifying the first end of the conduit as being connected to the second end of the conduit by correlating a first identifying feature of the first tag with a second identifying feature of the second tag, the second identifying feature matching the first identifying feature. In one aspect of this embodiment, the first aperture and the second aperture include a diameter that corresponds to a diameter of the conduit and wherein the first tag is positioned adjacent the first end of the conduit by way of the first aperture and the second tag is positioned adjacent the second end of the conduit by way of the second aperture.

In another aspect of this embodiment, the pair of tags is connected to one another via a connecting element and separating includes breaking a frangible connection between the first tag and the connecting element and breaking a frangible connection between the second tag and the connecting element. In yet another aspect of this embodiment, positioning the first tag adjacent the first end of the conduit includes sliding the first tag toward the first end and positioning the second tag adjacent the second end of the conduit includes sliding the second tag toward the second end. In yet another aspect of this embodiment, wherein the first identifying feature has a first shape and the second identifying feature has a second shape that is the same as the first shape but larger than the first shape. In a variant of this aspect, the first shape is formed by one of an indented portion and a raised portion of a body of the first tag and the second shape is formed by one of an indented portion and a raised portion of a body of the second tag. In a variant of this variant, the first tag includes an identifying pattern on the first tag body and the second tag includes an identifying pattern on the second tag body that matches the identifying pattern of the first tag. In another variant of this variant, the first tag body includes a gap formed along an edge of the body and a restriction extending from the first aperture and wherein attaching includes passing the conduit through the gap, past the restriction and into the first aperture. In yet another variant of this variant, the second tag body includes a gap formed along an edge of the body and a restriction extending from the second aperture and wherein attaching includes passing the conduit through the gap, past the restriction and into second aperture.

It will be appreciated that the various apparatuses and methods described in this summary section, as well as elsewhere in this application, can be expressed as a large number of different combinations and sub-combinations. All such useful, novel, and inventive combinations and sub-combinations are contemplated herein, it being recognized that the explicit expression of each of these combinations is unnecessary.

BRIEF DESCRIPTION OF THE DRAWINGS

The features of this disclosure, and the manner of attaining them, will become more apparent and the disclosure itself will be better understood by reference to the following description of embodiments of the disclosure taken in conjunction with the accompanying drawings.

DETAILED DESCRIPTION

Figure 1:
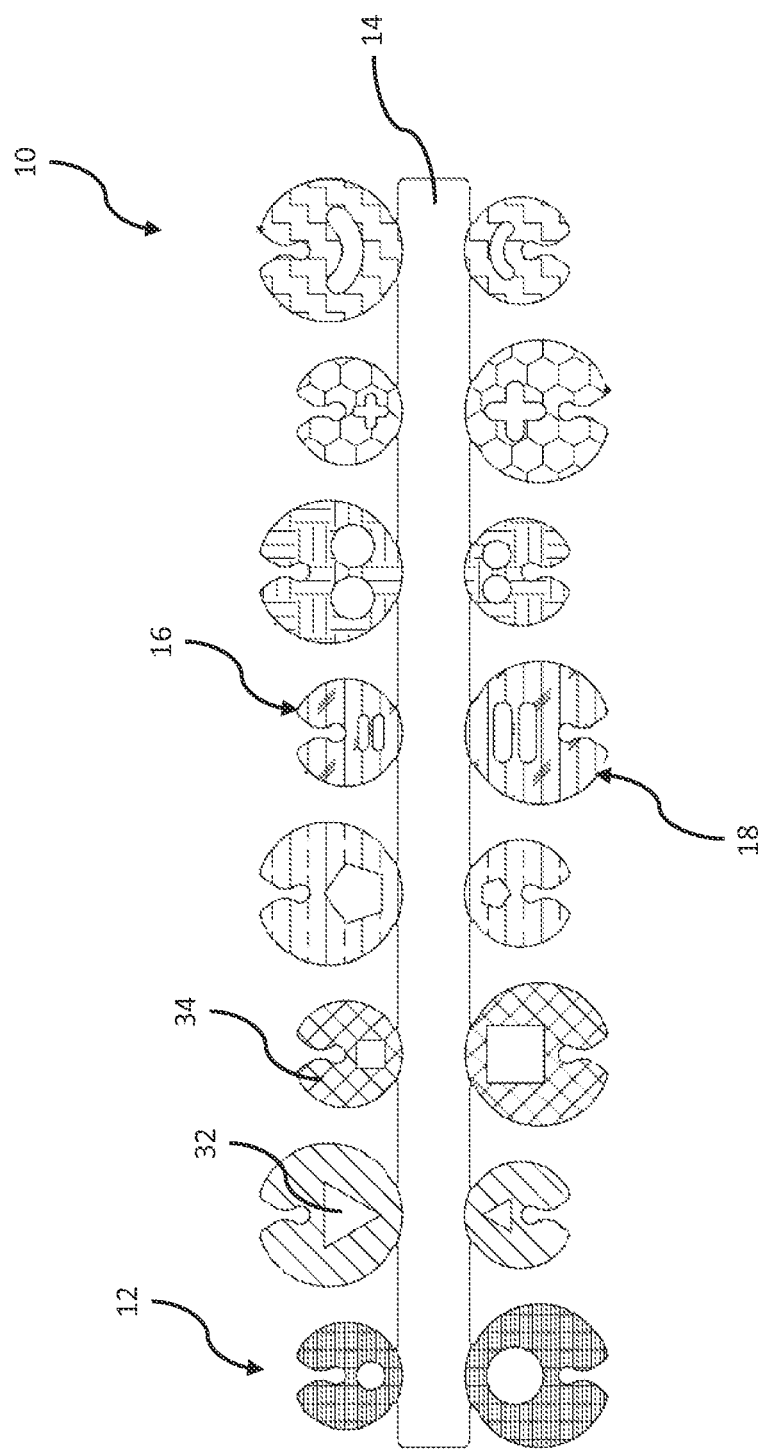
FIG. 1 is a top view of a set of conduit identification tags according to the present disclosure.

The description below and the accompanying drawings provide a general understanding of the environment for the apparatus described herein as well as the details for use of the apparatus. In the drawings, like reference numerals are used throughout to designate like elements.

As used herein, the term "conduit" refers to a passage that routes a substance from a source location to a destination location. The substance may be a liquid, a gas, electrical signals or power, optical signals, or any other substance that may be moved or transmitted through a conduit.

Referring now to FIG. 1, a set of conduit identification tags is shown. As is further described below, the tags in set 10 are configured to provide quick, reliable identification of conduits in a manner similar to the tags described in co-pending application Ser. No. 14/384,818, entitled "Conduit Identification System," filed Sep. 2, 2014 ("the '818 application), the entire contents of which being expressly incorporated herein by reference. Set 10 generally includes a plurality of pairs 12 of tags coupled to a connecting element 14. Each pair 12 includes a first tag 16 and a second tag 18.

In the embodiment shown, tags 16, 18 are disposed opposite one another and separated by connecting element 14. It should be understood, however, that pairs 12 may be disposed adjacent one another or in any other position relative to one another. It should also be understood that connecting element 14 is optional, and simply provides one means for carrying and organizing multiple pairs 12 of tags. Pairs 12 of tags may be alternatively be carried in a box, pouch or other carrying device. Tags 16, 18 of each pair 12 may be connected to one another (via a frangible connection) without use of connecting element 14 or disconnected from one another and carried loose.

Each tag 16, 18 of each pair 12 may be fabricated from a substrate of firm, but flexible material. Such materials include, but are not limited to, polypropylene, KEVLAR, acrylonitrile butadiene styrene plastic, plasticized polyvinyl chloride, polyethylene, numerous other plastics, rubber, aluminum, copper, or paper such as cardboard and other suitable materials. In one embodiment, cardboard is used of relatively thick stock that is laminated to repel moisture and permit handwritten or other included customized notations.

Figure 2:
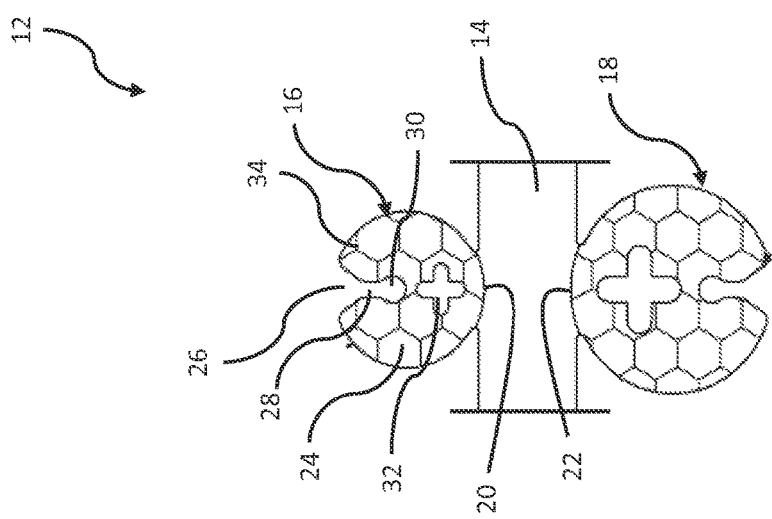
FIG. 2 is a top view of one pair of tags from the set depicted in FIG. 1.

Referring now to FIG. 2, an enlarged view of a single pair 12 of tags 16, 18 is shown. Tags 16, 18 are connected to connecting element 14 at frangible connections 20, 22, respectively. In the depicted embodiment, tags 16, 18 include the same features. Accordingly, only the features of tag 16 are described herein for brevity. Tag 16 includes a body 24 having a gap 26 formed therein. Gap 26 extends into body 24 and includes a restriction 28 and an aperture 30. The diameter of aperture 30 corresponds to the diameter of the conduit to be identified. Body 24 further includes one or more cut-out features 32. In one embodiment, the features 32 of a pair 12 of tags 16, 18 include the same shape, but the feature 32 of tag 18 is larger than the feature 32 of tag 16. In another embodiment, the features 32 are identical in size and shape. As shown in FIG. 1, the feature 32 of each pair 12 of tags 16, 18 of set 10 is unique within set 10.

Feature 32 may be cut-out from tag 16, embossed into tag 16, formed by a raised portion of tag 16, or any combination thereof. The unique shape of features 32 (relative to other pairs 12 of tags 16, 18) provide one way for a user to differentiate pairs 12 from one another. In the illustrated embodiment, features 32 correspond to common shapes that can be described in short, simple words to enable quick and easy identification and communication of the features 32. For example, as shown in FIG. 1, the various features 32 include a circle, a square, a triangle, a house, a pentagon, parallel slots, two circles, a plus sign, and a curved slot. Of course, many other shapes may be used. In further embodiments, features 32 may have shapes that correspond to components to which the conduit is connected. For example, features 32 may be shaped like a computer, a monitor, a speaker, a printer, a video disc, or a television to simplify identification of electrical cables in a computer or home theater environment.

In the depicted embodiment, body 24 further includes a pattern 34 formed therein and/or printed thereon. Like feature 32, pattern 34 is the same for each tag 16, 18 in a pair 12, but is unique relative to all other pairs 12 in set 10. Pattern 34 provides another way for a user to differentiate pairs 12 from one another. Patterns 34 and/or body 24 may also have a color or color combination that is unique to the pair 12 of tags 16, 18. The color may provide yet another way for a user to differentiate pairs 12 from one another.

Set 10 may be used to quickly and reliably identify conduits without requiring tracking the conduits from their source to their destination location, and without using specialized electrical signal tracing equipment. Specifically, tag 16 from one pair 12 is separated from connecting element 14 by breaking frangible connection 20 and tag 18 is separated from connecting element 14 by breaking frangible connection 22. Tag 16 is then attached to one end of a conduit (e.g., the destination or patient end) by either feeding the conduit directly through aperture 30 or forcing the conduit through gap 26, past restriction 28 (which may cause body 24 of tag 16 to flex thereby widening restriction 28) and into aperture 30. Once situated in aperture 30, the conduit is retained in place and tag 16 is retained on the conduit. Tag 18 is attached to the other end of the conduit (e.g., the source end) in the same manner. Alternatively, the user may attach both tags 16, 18 to one end of the conduit and slide one of tags 16, 18 to the other end. The user may use the same process to attach other pairs 12 of tags 16, 18 to other conduits.

The order of attachment of tags 16, 18 is merely exemplary. Tag 18 may be attached first. It should be understood, however, that it may be desirable to attach the smaller tag 16, 18 of the pairs 12 to the patient end of the conduit. Several conduits may be coupled to the patient in close proximity to one another and use of the smaller tag 16, 18 of the pairs at the patient end may reduce interference between tags and clutter.

Once attached, pairs 12 of tags 16, 18 permit the user such as a healthcare provider to quickly and reliably distinguish multiple conduits from one another and verify their proper connection regardless of how tangled or obscured the conduits are without tracing the conduits from their source to their destination locations. In one embodiment, the user may identify the source and destination ends of a conduit by identifying one or more of the unique matching features 32, patterns 34 or colors of tags 16, 18 of a particular pair 12. In another embodiment, the shape of pairs 12 of tags 16, 18 are also unique relative to other pairs as described in the '818 application referred to above. This may provide yet another way to identify matching ends of a conduit.

To use the identification tags in a healthcare setting a user removes a tag 16 from connecting element 14 by breaking frangible connection 20 and the corresponding tag 18 of the pair 12 from connecting element 14 by breaking frangible connection 22. Tags 16, 18 are then attached to opposite ends of, for example, an IV tube in the manner described above, enabling a user to identify the fluid fed to a particular tube by correlating the shape of features 32, the patterns 34 and/or the colors of tags 16, 18.

To use the identification tags on an electrical cable, a user removes tags 16, 18 from set 10 in the manner described above. Tags 16, 18 are attached at opposite ends of an electrical power or signal cable to enable a user to identify both ends of a cable without necessitating testing the cable or tracing the cable from one end to the other.

It should be understood that while the identification tags have been described with reference to use in a medical or electrical environment, the conduit identification tags can be used in other environments as well. For example, in one embodiment the identification tags can be used to identify wires in an automobile and simplify tracking of wires running between various components and wiring harnesses in the vehicle. In another embodiment, the identification tags can be used to identify pipes or hoses in home, or in automotive or industrial applications.

While the preferred embodiments have been illustrated and described in detail in the drawings and foregoing description, the same should be considered illustrative and not restrictive. All changes, modifications, and further applications are desired to be protected.

What is claimed is:

1. An identifier for a conduit comprising:
a first tag having a first tag body with a first aperture formed therein for receiving the conduit and a first identifying feature; and
a second tag having a second tag body with a second aperture formed therein for receiving the conduit and a second identifying feature that matches the first identifying feature;
wherein the first tag is attached to the conduit adjacent one end, the second tag is attached to the conduit adjacent another end, and the ends are identified as ends of the same conduit by the matching first and second identifying features,
wherein the first identifying feature has a first shape and the second identifying feature has a second shape that is the same as the first shape but larger than the first shape, and
wherein the first shape is formed by a cut-out portion from the first tag body and the second shape is formed by a cut-out portion from the second tag body.

2. The identifier of claim 1 wherein the first tag includes an identifying pattern on the first tag body and the second tag includes an identifying pattern on the second tag body that matches the identifying pattern of the first tag.

3. The identifier of claim 2 wherein the first tag includes a color on the first tag body and the second tag includes a color on the second tag body that matches the color on the first tag body.

4. The identifier of claim 1 further comprising a connecting element, the first tag being coupled to the connecting element by a frangible connection and the second tag being coupled to the connecting element by a frangible connection.

5. The identifier of claim 4 wherein the first tag is coupled to the connecting element at a location opposite from a location wherein the second tag is coupled to the connecting element.

6. The identifier of claim 1 wherein the first tag is smaller than the second tag.

7. The identifier of claim 1 wherein the first tag body includes a gap formed along an edge of the body and a restriction extending from the first aperture so that the body is connected to the conduit by passing the conduit through the gap, past the restriction and into the first aperture.

8. The identifier of claim 1 wherein the second tag body includes a gap formed along an edge of the body and a restriction extending from the second aperture so that the body is connected to the conduit by passing the conduit through the gap, past the restriction and into second aperture.

9. A set of identifiers for a plurality of conduits comprising:
a connecting element; and
a plurality of pairs of tags coupled to the connecting element, each pair of tags including
a first tag having a first tag body with a first aperture formed therein for receiving a conduit and a first identifying feature, and
a second tag having a body with a second aperture formed therein for receiving the conduit and a second identifying feature that matches the first identifying feature;
wherein the first tag of each pair is attached to the conduit adjacent one end, the second tag is attached to the conduit adjacent another end, and the ends are identified as ends of the same conduit by the matching first and second identifying features,
wherein the first identifying feature has a first shape and the second identifying feature has a second shape that is the same as the first shape but larger than the first shape, and
wherein the first shape is formed by a cut-out portion from the first tag body and the second shape is formed by a cut-out portion from the second tag body.

10. The set of identifiers of claim 9 wherein each pair of tags is coupled to the connecting element by a frangible connection.

11. The set of identifiers of claim 9 wherein one tag of each pair of tags is coupled to another tag of the pair of tags by a frangible connection.

12. The set of identifiers of claim 9 wherein the first aperture and the second aperture include a diameter that corresponds to a diameter of the conduit and wherein the first tag attaches to the conduit by way of the first aperture and the second tag attaches to the conduit by way of the second aperture.

13. The set of identifiers of claim 9 wherein the first tag includes an identifying pattern on the first tag body and the second tag includes an identifying pattern on the second tag body that matches the identifying pattern of the first tag.

14. The set of identifiers of claim 9 wherein the first tag body includes a gap formed along an edge of the body and a restriction extending from the first aperture so that the body is connected to the conduit by passing the conduit through the gap, past the restriction and into the first aperture.

15. The set of identifiers of claim 9 wherein the second tag body includes a gap formed along an edge of the body and a restriction extending from the second aperture so that the body is connected to the conduit by passing the conduit through the gap, past the restriction and into second aperture.

16. A method of identifying a conduit comprising:
separating a pair of tags from one another by breaking at least one frangible connection between the tags;
attaching a first tag from the pair of tags to the conduit by positioning the conduit in an aperture formed in the first tag;
positioning the first tag adjacent a first end of the conduit;
attaching a second tag from the pair of tags to the conduit by positioning the conduit in an aperture formed in the second tag;
positioning the second tag adjacent a second end of the conduit; and
identifying the first end of the conduit as being connected to the second end of the conduit by correlating a first identifying feature of the first tag with a second identifying feature of the second tag, the second identifying feature matching the first identifying feature, the first identifying feature having a first shape and the second identifying feature having a second shape that is the same as the first shape but larger than the first shape, and the first shape is formed by a cut-out portion from a first tag body of the first tag and the second shape is formed by a cut-out portion from a second tag body of the second tag.

17. The method of claim 16 wherein the first aperture and the second aperture include a diameter that corresponds to a diameter of the conduit and wherein the first tag is positioned adjacent the first end of the conduit by way of the first aperture and the second tag is positioned adjacent the second end of the conduit by way of the second aperture.

18. The method of claim 16 wherein the pair of tags is connected to one another via a connecting element and separating includes breaking a frangible connection between the first tag and the connecting element and breaking a frangible connection between the second tag and the connecting element.

19. The method of claim 16 wherein positioning the first tag adjacent the first end of the conduit includes sliding the first tag toward the first end and positioning the second tag adjacent the second end of the conduit includes sliding the second tag toward the second end.

20. The method of claim 16 wherein the first tag includes an identifying pattern on the first tag body and the second tag includes an identifying pattern on the second tag body that matches the identifying pattern of the first tag.

21. The method of claim 16 wherein the first tag body includes a gap formed along an edge of the body and a restriction extending from the first aperture and wherein attaching includes passing the conduit through the gap, past the restriction and into the first aperture.

22. The method of claim 16 wherein the second tag body includes a gap formed along an edge of the body and a restriction extending from the second aperture and wherein attaching includes passing the conduit through the gap, past the restriction and into second aperture.

* * * * *